US010084492B2

(12) United States Patent
Graceffo et al.

(10) Patent No.: US 10,084,492 B2
(45) Date of Patent: Sep. 25, 2018

(54) METHOD AND SYSTEM FOR NON-PERSISTENT REAL-TIME ENCRYPTION KEY DISTRIBUTION

(71) Applicant: Raytheon Company, Waltham, MA (US)

(72) Inventors: Gary M. Graceffo, Burke, VA (US); Andrew M. Kowalevicz, Arlington, VA (US); Bradley A. Whittington, Plano, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/704,923

(22) Filed: May 5, 2015

(65) Prior Publication Data

US 2015/0318985 A1    Nov. 5, 2015

Related U.S. Application Data

(60) Provisional application No. 61/988,423, filed on May 5, 2014, provisional application No. 61/988,416, filed on May 5, 2014, provisional application No. 61/988,409, filed on May 5, 2014, provisional application No. 61/988,418, filed on May 5, 2014.

(51) Int. Cl.
| | | |
|---|---|---|
| *H04L 9/06* | (2006.01) | |
| *H04B 1/04* | (2006.01) | |
| *H04L 9/08* | (2006.01) | |
| *H04L 9/16* | (2006.01) | |
| *H04L 7/06* | (2006.01) | |
| *H04L 7/04* | (2006.01) | |
| *H04L 25/49* | (2006.01) | |
| *H04L 12/26* | (2006.01) | |
| *G09C 1/00* | (2006.01) | |

(52) U.S. Cl.
CPC ............. *H04B 1/0475* (2013.01); *G09C 1/00* (2013.01); *H04L 7/042* (2013.01); *H04L 7/065* (2013.01); *H04L 9/08* (2013.01); *H04L 9/16* (2013.01); *H04L 25/4902* (2013.01); *H04L 43/087* (2013.01); *H04L 43/0864* (2013.01)

(58) Field of Classification Search
CPC . H04L 9/08; H04L 9/16; H04L 9/0816; H04L 9/06; H04L 9/00; H04L 63/0428
See application file for complete search history.

(56) References Cited

U.S. PATENT DOCUMENTS

| | | | |
|---|---|---|---|
| 4,221,931 A | 9/1980 | Seiler | |
| 5,488,659 A * | 1/1996 | Miliani | H04N 7/167 348/E7.055 |
| 7,269,261 B1 | 9/2007 | Jennings | |

(Continued)

OTHER PUBLICATIONS

"U.S. Appl. No. 14/704,900, Notice of Allowance dated Apr. 28, 2017", 9 pgs.

(Continued)

*Primary Examiner* — Catherine Thiaw
*Assistant Examiner* — Carlton Johnson
(74) *Attorney, Agent, or Firm* — Schwegman Lundberg & Woessner, P.A.

(57) ABSTRACT

An data channel system and method provide a composite signal having an overt, persistent signal channel and a non-persistent channel encoded onto a signal in the persistent channel by timing variation of the persistent channel signal.

12 Claims, 4 Drawing Sheets

(56) References Cited

U.S. PATENT DOCUMENTS

| | | | |
|---|---|---|---|
| 9,755,674 B2 | 9/2017 | Graceffo et al. | |
| 2002/0063933 A1* | 5/2002 | Maeda | H04B 10/2504 |
| | | | 398/141 |
| 2002/0071556 A1 | 6/2002 | Moskowitz et al. | |
| 2004/0125952 A1 | 7/2004 | Alattar et al. | |
| 2006/0239501 A1 | 10/2006 | Petrovic et al. | |
| 2006/0239503 A1 | 10/2006 | Petrovic et al. | |
| 2009/0196419 A1 | 8/2009 | Tapster | |
| 2009/0287837 A1 | 11/2009 | Felsher | |
| 2011/0299678 A1* | 12/2011 | Deas | H04L 9/003 |
| | | | 380/28 |
| 2013/0108042 A1* | 5/2013 | Yin | H04N 21/4405 |
| | | | 380/255 |

OTHER PUBLICATIONS

"U.S. Appl. No. 14/704,900, Response filed Apr. 6, 2017 to Final Office Action dated Mar. 15, 2017", 6 pgs.

"U.S. Appl. No. 14/704,900, Final Office Action dated Mar. 15, 2017", 7 pgs.

"U.S. Appl. No. 14/704,900, Response filed Dec. 30, 2016 to Non Final Office Action dated Oct. 3, 2016", 8 pgs.

"U.S. Appl. No. 14/704,900, Response filed Dec. 30, 2016 to Non-Final Office Action dated Oct. 3, 2016", 8 pgs.

"U.S. Appl. No. 14/704,900, Comments on Reasons for Notice of Allowance filed Jul. 24, 2017", 1 pg.

\* cited by examiner

METHOD AND SYSTEM FOR NON-PERSISTENT REAL-TIME ENCRYPTION KEY DISTRIBUTION

CROSS REFERENCE TO RELATED APPLICATIONS

This application claims priority from U.S. Provisional Patent Application Ser. No. 61/988,409, filed May 5, 2014, U.S. Provisional Patent Application Ser. No. 61/988,416, filed May 5, 2014, U.S. Provisional Patent Application Ser. No. 61/988,423, filed May 5, 2014, and U.S. Provisional Patent Application Ser. No. 61/988,418, filed May 5, 2014, all of which are incorporated herein by reference in their entirety.

FIELD OF THE INVENTION

The present invention generally relates to data encryption for transmission purposes, and in particular to such practices which use timing modulation.

BACKGROUND OF THE INVENTION

Systems employing a symmetric encryption method require that the sender and receiver of a cipher text message have the same encryption and decryption key. Providing the key to the receiver poses a risk in that if the key is compromised, by a nefarious third party, then all subsequent cipher text will be compromised, until the key is updated. For this reason, key protection and management is a critical part of systems employing crypto equipment. Proposed in this application is a novel method for key distribution.

There are a number of ways that keys are presently distributed. All methods require a coordinated key exchange. These methods are a function of the type of mission and type of encryption. In symmetric key cryptography, both parties must possess a common key. Distribution of keys is done according to an approved security plan. Methods of exchanging keys include first person exchange, by couriers with secure pouches, or sending the key through an existing encryption channel. The problem with the above method is that if the key becomes compromised, then all subsequent messages are compromised until the key is updated.

In view of the above discussion, it would be beneficial to have secure means for distributing encryption or decryption keys. It would be further beneficial to have a method of key distribution that does not require users on either end of the data link to handle the keys or to have prior knowledge of the keys. It would be further beneficial to have a method of key distribution where the keys are not persistent and can be rotated as frequently as desired, and even support multiple encryption keys per message.

SUMMARY OF THE INVENTION

One embodiment of the present invention provides a system for encoding data in a signal, comprising: at least one signal carrier; an overt persistent signal channel containing an encrypted signal and carried on the at least one signal carrier; a non-persistent channel encoded on to the encrypted signal by timing variation of the encrypted signal, the non-persistent channel containing at least one decryption key.

The at least one decryption key may include a plurality of decryption keys. The encrypted signal may be divided into data segments with each data segment corresponding to a different one of the plurality of decryption keys. Each data segment in the encrypted signal may be temporally associated with its respective corresponding decryption key. The encrypted signal may include an unencrypted preamble and an encrypted postamble.

The system may further comprise: a processing circuit coupled to receive the encrypted signal from the at least one signal carrier; and a high stability oscillator (HSO) producing a reference signal coupled to the processor for use in reading timing variations of the encrypted signal, wherein the reference signal has a stability greater than a level of timing variations of the encrypted signal; and wherein the timing variations of the encrypted signal are smaller than a sampling period for detecting and capturing the encrypted signal.

The timing variations of the encrypted signal may be smaller than a sampling period for detecting and capturing the encrypted signal. The encrypted signal may be a digital data stream, and further wherein the timing variations may be pulse timing variations.

Another embodiment of the present invention provides a method for sending an encrypted signal on a signal carrier, comprising: modulating an encrypted signal in an overt persistent channel to create a non-persistent channel including at least one decryption key, using timing variations; reading timing variations from the encrypted signal for separating the decryption key; and decrypting the encrypted signal using the decryption key.

The non-persistent channel may include a plurality of decryption keys. The encrypted signal may be divided into data segments with each data segment corresponding to a different decryption key. Each data segment may be temporally related to its respective corresponding encryption key. The encrypted signal may include a non-encrypted preamble and an encrypted postamble. The timing variation may be smaller than a sampling period for detecting and capturing the encrypted signal.

Yet another embodiment of the present invention provides a system for encrypting data in a signal, comprising: a plurality of signal carriers; a separate overt persistent signal channel in each signal carrier, with each channel containing a separate host signal; and a separate non-persistent channel encoded on to each host signal by timing variations of the respective host signal, wherein one separate non-persistent channel contains an encrypted signal and another separate non-persistent channel contains at least one decryption key.

The at least one decryption key may include a plurality of decryption keys. The encrypted signal may be divided into data segments with each data segment corresponding to a different one of the plurality of decryption keys. Each data segment in the encrypted signal may be temporally associated with its respective corresponding decryption key.

The encrypted signal may include an unencrypted preamble and an encrypted postamble. The system may further comprise: a processing circuit coupled to receive the host signals from the plurality of signal carriers; and an HSO producing a reference signal coupled to the processor for use in reading timing variations of both of the host signals, wherein the reference signal has a stability greater than a level of timing variations of the encrypted signal; and wherein the timing variations of the encrypted signal are smaller than a sampling period for detecting and capturing the encrypted signal. The timing variations of the encrypted signal may be smaller than a sampling period for detecting and capturing the encrypted signal.

BRIEF DESCRIPTION OF THE DRAWINGS

The present invention is illustratively shown and described in reference to the accompanying drawings, in which.

DETAILED DESCRIPTION OF THE DRAWINGS

The present invention generally provides a composite signal having an overt, persistent signal channel and a non-persistent channel encoded onto a signal in the persistent channel by timing variation of the persistent channel signal. The term non-persistent means that without specific knowledge of how to receive and process the channel, the non-persistent data is lost. The non-persistent channel is implemented using a stability oscillator (HSO). Using a modulation scheme such as a Gaussian Clock Dither Modulation (GCDM) scheme and the HSO, the data in the non-persistent channel is imperceptible to anyone not possessing a comparable stable oscillator tuned to the appropriate frequency and phase. Given that the keys are extracted as they are received and applied directly to the cipher text message, the keys may be discarded once used.

Anyone intercepting these transmissions, not using an oscillator with comparable precision, will lose the non-persistent channel, upon reception. This is because the granularity of the received transmission will have insufficient time resolution to detect the timing variations of the channel. The oscillator may have a stability of $10^{-15}$ part of a second as opposed to the de facto industry standard of Cesium, which is $10^{-12}$ part of a second.

Figure 1:
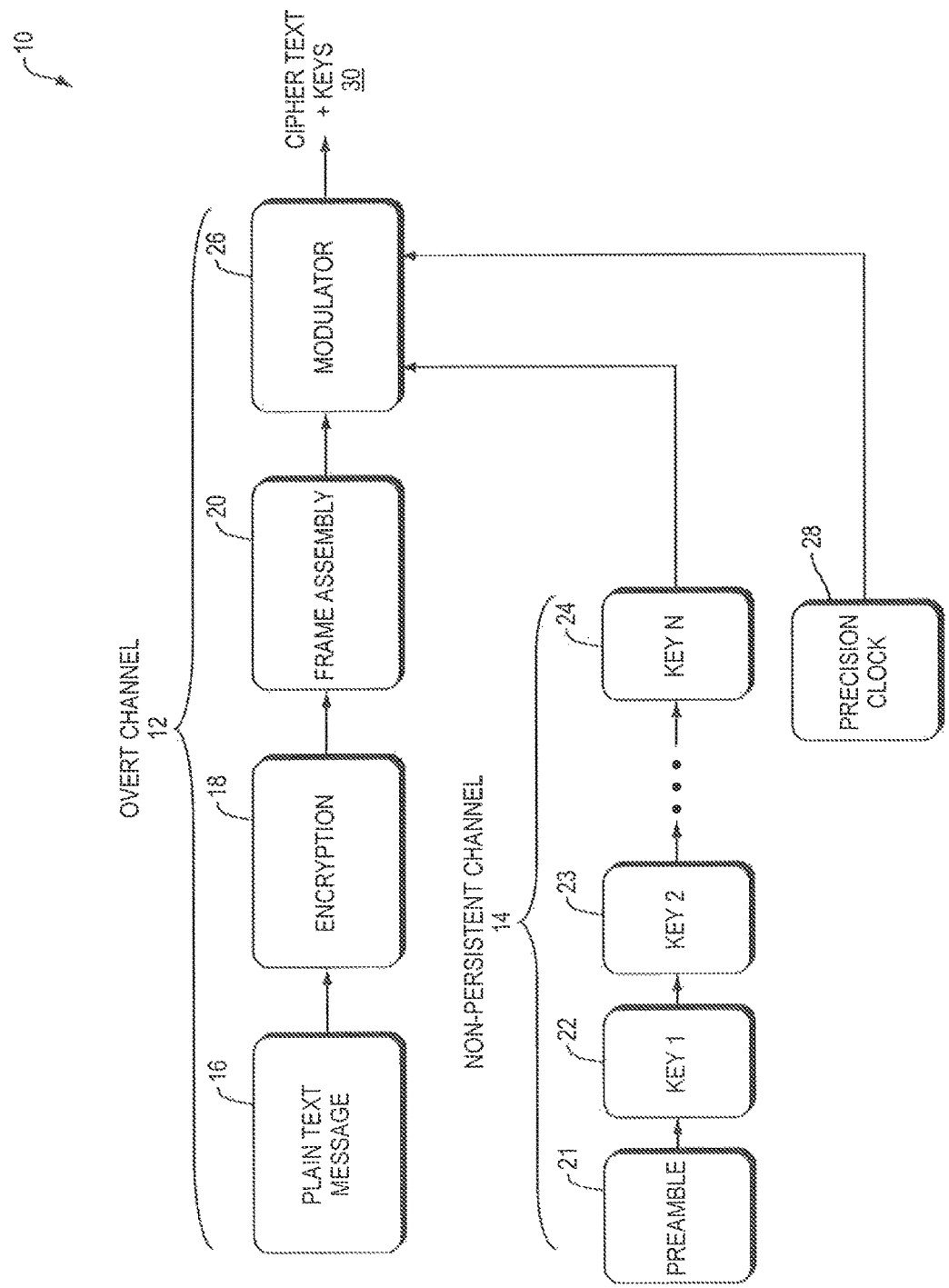
FIG. 1 is a block diagram of a single carrier channel assembly in accordance with an embodiment of the present invention.

FIG. 1 shows a block diagram 10 of a single carrier channel assembly, which includes an overt channel 12 and a non-persistent channel 14. Overt channel 12 starts with a plain text message 16 to be encrypted and puts it through encryption process 18. The encrypted message is typically put through a frame assembly process 20. Non-persistent channel 14 is assembled using a preamble 21 and at least one decryption key 22, 23, 24. Both the encrypted message in the desired frame format and the decryption keys 22, 23, 24 are coupled to a modulator 26 to modulate the encryption keys onto the encrypted message by creating time variations in the encrypted signal by reference to an HSO 28. Using a modulation scheme such as GCDM in modulator 26 and the HSO 28, the data in the non-persistent channel is imperceptible to anyone not actively processing the live signal with a comparable stable oscillator tuned to the appropriate frequency. In the absence of these requirements, the modulation and thus, the encryption keys 22, 23, 24 are lost. The output cipher text and decryption keys 30 thereby include the encrypted message divided into appropriate frames for transmission and modulated with timing variations to carry the decryption keys 22, 23, 24.

Figure 2:
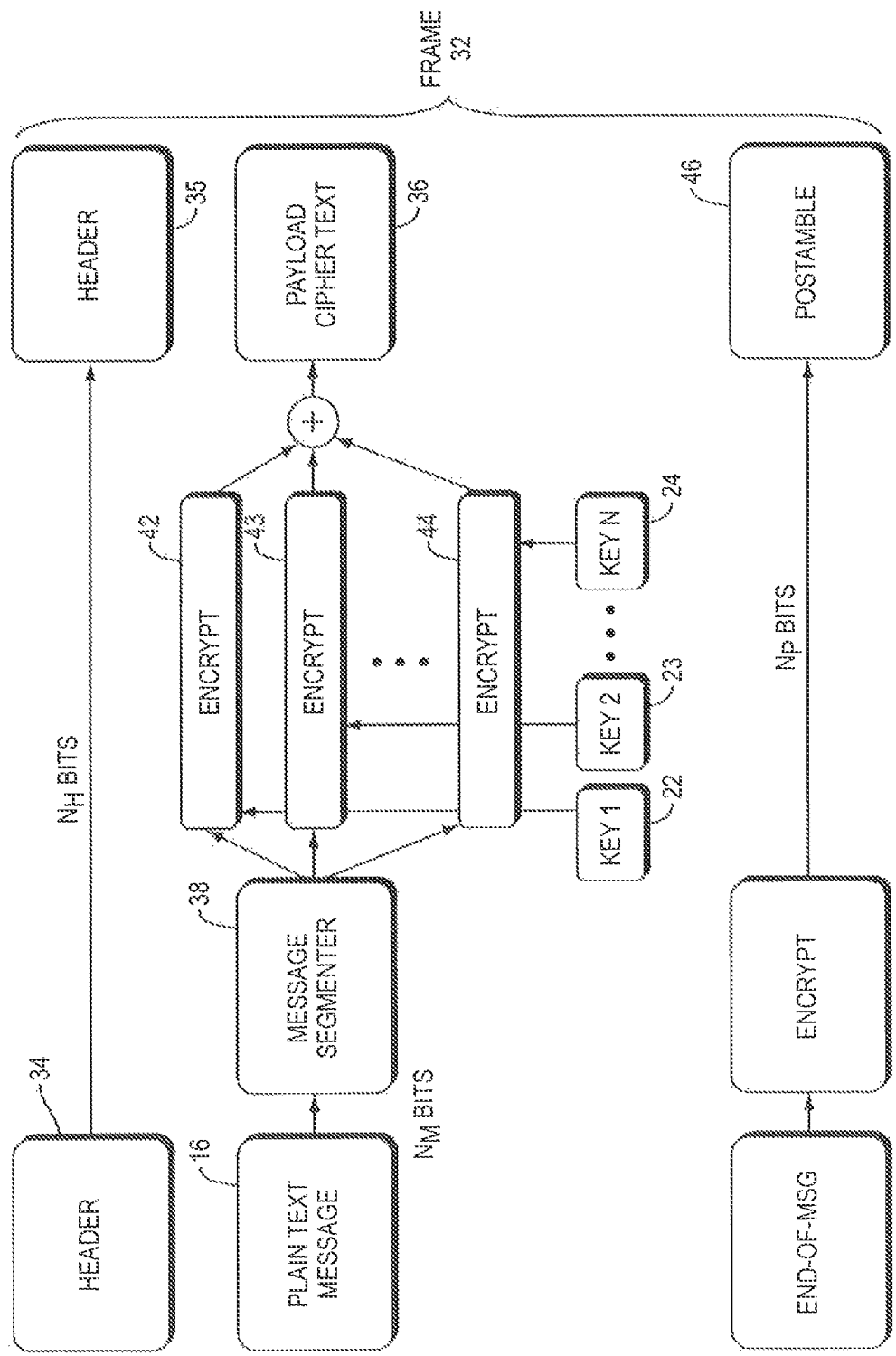
FIG. 2 illustrates a carrier channel assembly in accordance with an embodiment of the present invention.

FIG. 2 illustrates the frame assembly for the overt channel in greater detail. Each frame 32 includes a header 34 of length $N_H$. The Header field 35 identifies the start of a message and is therefore transmitted in the open or not encrypted. The Header field is followed by the payload 36, which contains $N_M$ bits. The message 16 to be encrypted is segmented 38 into N segments. Each segment is encrypted with a unique cryptographic key 22, 23, 24 in segment tours 42, 43, 44. The number of segments may be dependent on the number of keys available to encrypt the message. Finally, a postamble 46 is included. The postamble 46 contains $N_p$ encrypted end-of-message data bits.

Figure 3:
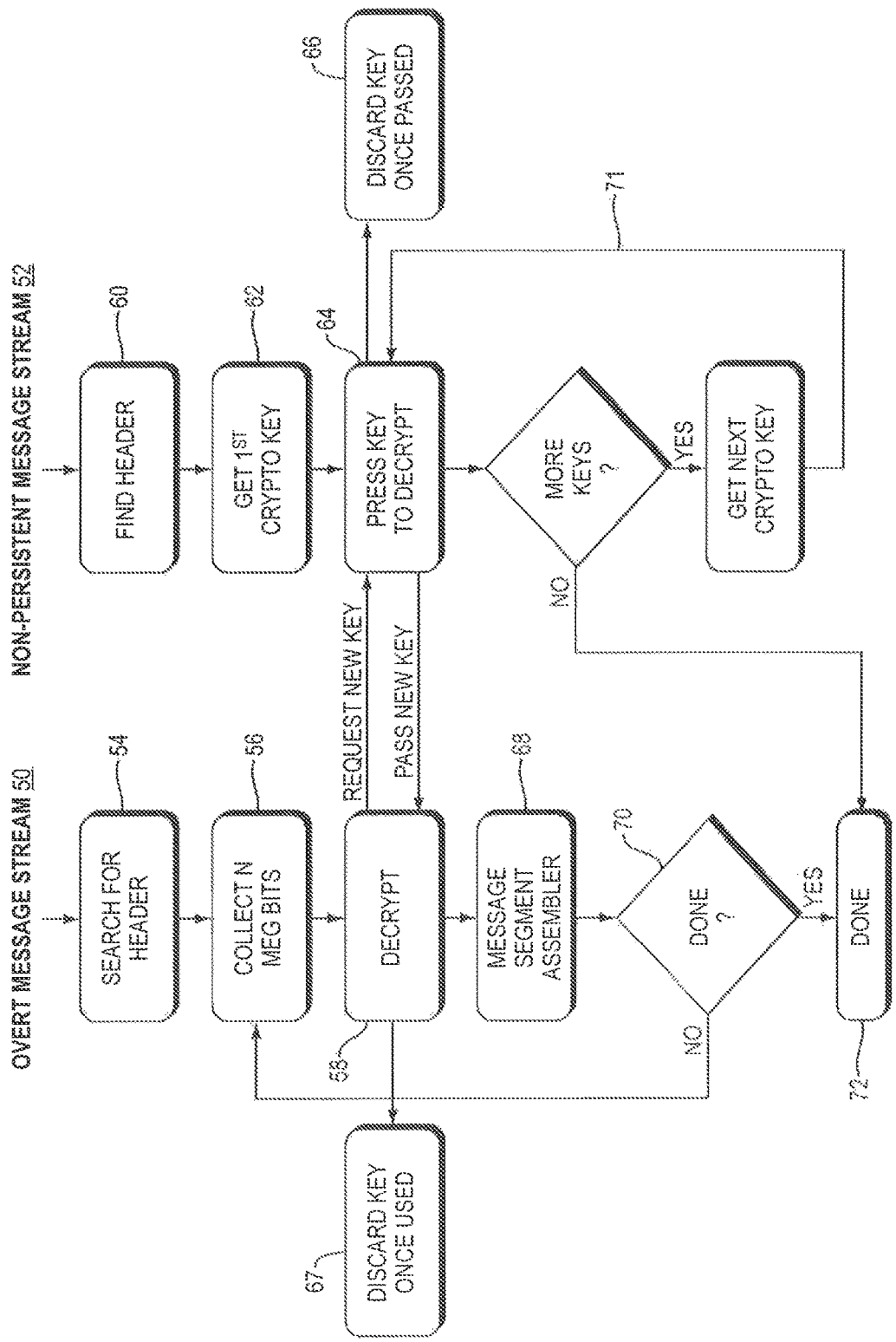
FIG. 3 shows a block diagram of a decryption process in accordance with an embodiment of the present invention.

The decryption process is shown in a block diagram in FIG. 3. The overt message stream 50 and non-persistent message stream 52 are processed independently, ensuring that time ordering of the respective data remains unchanged. The decryption process works in the following manner. Overt message stream 50 is correlated to detect a header in step 54. Once a header is found, step 56 passes the next N bits to the decryptor 58. N is a predetermined number of bits. In parallel, non-persistent message stream 52 is correlated in step 60 to detect a header for encryption keys. The decryption keys are separated in 62 and stored in a memory 64 for use as needed with corresponding encrypted data segments.

The decryptor 58 requests a decryption key from memory 64 and then decrypts the N-bits in the message segment. The non-persistent stream processor discards the key in step 66 once it is passed to decryptor 58 and decryptor 58 discards the key once it is used in step 67.

Decrypted message segments are passed to assembler 68 to create completed messages. If a message in assembler 68 is not complete, process step 70 returns the processing to the collection of segments of message bits in step 56. Respective decryption keys are likewise retrieved using a loop 71. If a message is complete it is outputted through step 72.

Figure 4:
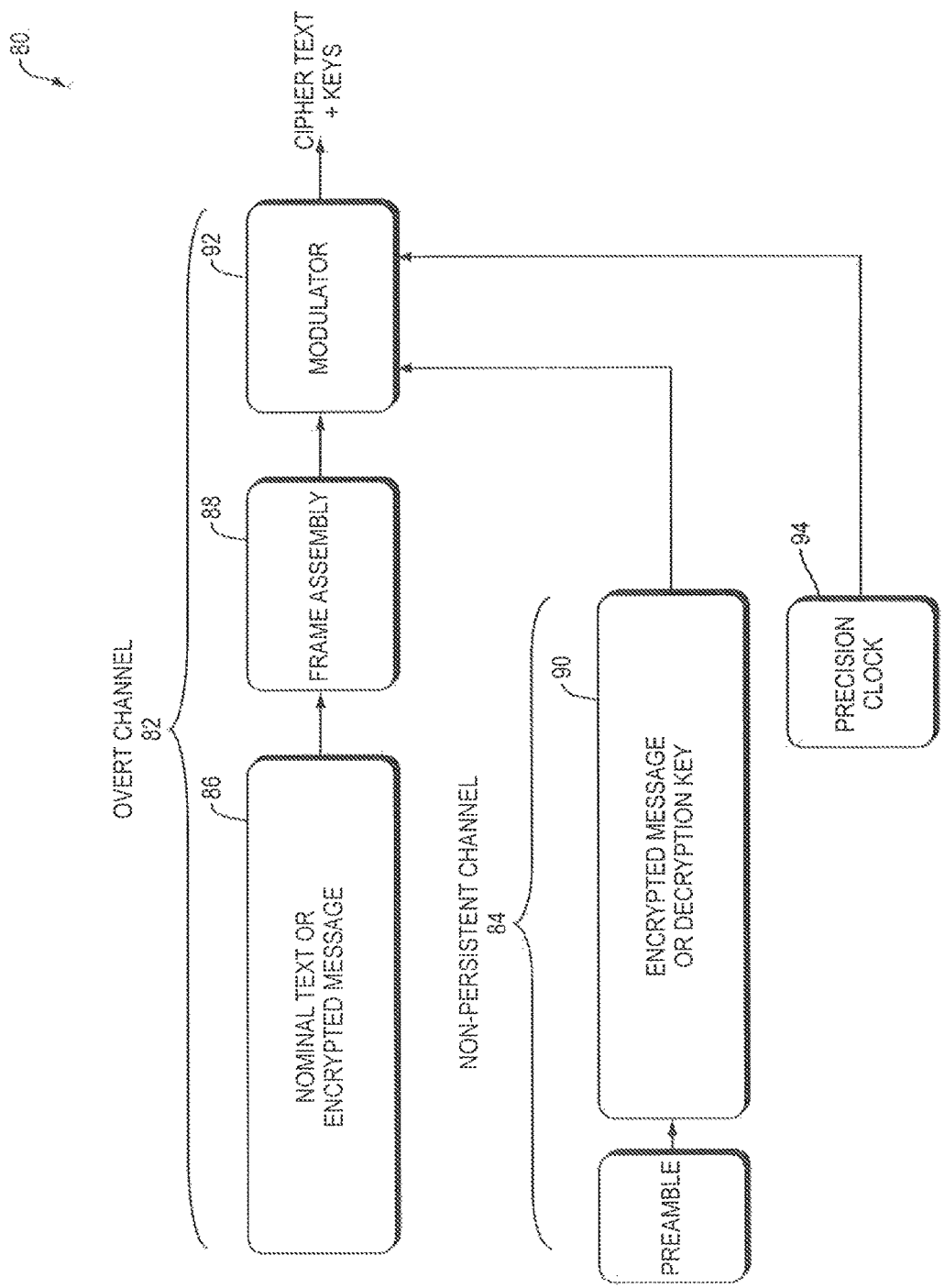
FIG. 4 shows a block diagram of a signal carrier implemented for a system with two or more signal carriers in accordance with an embodiment of the present invention.

FIG. 4 shows an embodiment of the present invention implemented for two or more signal carriers. Each signal carrier 80 includes an overt channel 82 and a non-persistent channel 84. Each overt channel 82 is formed from a nominal plain text message or an encrypted signal 86 and broken into segments in step 88. The non-persistent channel 84 may include either an encrypted message or a decryption key 90 which is used by modulator 92 in conjunction with precision clock 94 for modulating timing variations in the data of overt channel 82.

The dual or plurality of signal carrier implementation of FIG. 4 is practiced using the same principles as the single carrier embodiment of FIG. 1. The plural carrier approach of FIG. 4 provides greater bandwidth and thereby enables greater variation in the arrangement of encrypted signals and decryption keys. Like the encrypted signals, decryption keys may also be divided into several segments for modulation and transmission and then recombined to enable decryption. Also, the text messages in the overt channel may be provided with nominal text or data to appear less as an encrypted message or may include an encrypted message.

The present invention is introduced using examples and particular embodiments for descriptive purposes. Although a variety of examples are presented to show how various configurations can be employed to achieve the desired improvements, these particular embodiments are only illustrative and not intended in any way to restrict the inventions presented.

The resulting systems and method described above provide that encrypted data and/or decryption keys will be lost if not adequately received by a system capable of reading the active timing variations. Attempts at simply detecting and storing the transmission signals created by the present invention are not adequate for preserving the time variation information contained therein. The present system also supports the use of multiple decryption keys per message and delivers those keys as part of the message to more securely avoid discovery and/or interception thereof.

The present application, METHOD AND SYSTEM FOR NON-PERSISTENT REAL-TIME ENCRYPTION KEY DISTRIBUTION is being filed on the same day as and in conjunction with related applications: METHOD AND SYSTEM FOR NON-PERSISTENT COMMUNICATION; METHODS FOR ENCRYPTION OBFUSCATION; and SYSTEM AND METHOD TO DETECT TIME-DELAYS IN NON-PERIODIC SIGNALS, which applications all share some common inventors herewith, and the contents of which are all hereby incorporated herein in their entirety.

The present invention is introduced using examples and particular embodiments for descriptive purposes. Although a variety of examples are presented to show how various configurations can be employed to achieve the desired improvements, these particular embodiments are only illustrative and not intended in any way to restrict the inventions presented.

What is claimed is:

1. A system comprising:
   a first clock;
   a modulator coupled to the first clock, the modulator to receive at least one signal carrier including encrypted signal data carried thereon, the modulator to receive decryption keys and modulate the signal carrier to include the decryption keys carried thereon by timing variations of a falling edge of the encrypted signal data using the first clock, the decryption keys each to decrypt a portion of data associated with the encrypted signal, wherein the timing variations includes less dither than a second clock used to modulate the encrypted signal data onto the carrier signal and greater dither than the first clock; and
   a processor to read the timing variations from the encrypted signal data to separate the decryption keys and decrypting, using a third clock with a resolution greater than or equal to the resolution of the first clock, the encrypted signal data using the decryption keys.

2. The system of claim 1, wherein the encrypted signal is divided into data segments with each data segment corresponding to a different one of the decryption keys.

3. The system of claim 2, wherein each data segment in the encrypted signal is temporally associated with its respective corresponding decryption key.

4. The system of claim 1, wherein the encrypted signal includes an unencrypted preamble and an encrypted postamble.

5. The system of claim 1, further comprising:
   a processing circuit to receive the modulated encrypted signal and
   a third clock to produce a reference signal, the third clock coupled to the processing circuit;
   wherein the processing circuit is further to detect the timing variations of the modulated encrypted signal, wherein the reference signal has a resolution of at least the first clock; and
   wherein the timing variations of the encrypted signal are smaller than a sampling period for detecting and capturing the encrypted signal.

6. The system of claim 1, wherein the timing variations of the encrypted signal are smaller than a sampling period for detecting and capturing the encrypted signal.

7. The system of claim 1, wherein the encrypted signal is a digital data stream, and further wherein the timing variations are pulse timing variations.

8. A method comprising:
   modulating, using a modulator, a first clock, and decryption keys, an encrypted signal carrier to include the decryption keys by timing variations of a falling edge of the encrypted signal data, the encrypted signal carrier including a carrier signal with the encrypted signal data carried modulated thereon, wherein the timing variations includes less dither than a second clock used to modulate the encrypted signal data onto the carrier signal and greater dither than the first clock:
   reading the timing variations from the encrypted signal data to separate the decryption keys; and
   decrypting, using a third clock with a resolution greater than or equal to the resolution of the first clock, the encrypted signal data using the decryption keys.

9. The method of claim 8, wherein the encrypted signal is divided into data segments with each data segment corresponding to a different decryption key.

10. The method of claim 9, wherein each data segment is temporally related to its respective corresponding encryption key.

11. The method of claim 8, wherein the encrypted signal includes a non-encrypted preamble and an encrypted postamble.

12. The method of claim 8, wherein the timing variations are smaller than a sampling period for capturing the encrypted signal.

* * * * *